United States Patent

Dyer et al.

[11] Patent Number: 5,772,258
[45] Date of Patent: Jun. 30, 1998

[54] CONDUIT CLAMP AND TETHER

[75] Inventors: Edward P. Dyer, Germantown; Kenneth A. Christian, Milwaukee, both of Wis.

[73] Assignee: Tyton-Hellermann Corp., Milwaukee, Wis.

[21] Appl. No.: 575,938

[22] Filed: Dec. 20, 1995

[51] Int. Cl.⁶ .............................. F16L 3/08; B65D 63/00
[52] U.S. Cl. ...................... 285/114; 785/252; 24/16 PB
[58] Field of Search ............................ 24/16 R, 16 PB, 24/20 R, 17 AP; 285/114, 117, 242, 252; 248/68.1

[56] References Cited

U.S. PATENT DOCUMENTS

| | | | |
|---|---|---|---|
| 4,093,282 | 6/1978 | Kyriakodis | 285/114 |
| 4,663,807 | 5/1987 | Bozzo | 24/16 PB |
| 4,840,345 | 6/1989 | Nell et al. | 24/16 PB |
| 4,958,791 | 9/1990 | Nakamura | 24/16 PB |
| 5,020,749 | 6/1991 | Kraus | 24/16 PB |
| 5,024,405 | 6/1991 | McGuire | 24/16 PB |
| 5,148,576 | 9/1992 | Dyer | 24/16 R |
| 5,157,815 | 10/1992 | Dyer | 24/20 R |
| 5,248,306 | 9/1993 | Clark et al. | 285/114 |
| 5,367,750 | 11/1994 | Ward | 24/17 AP |
| 5,568,906 | 10/1996 | Hahn et al. | 248/74.1 |

FOREIGN PATENT DOCUMENTS 2205137  11/1988  United Kingdom .................. 285/318

Primary Examiner—Eric K. Nicholson
Attorney, Agent, or Firm—Ryan, Maki, Mann & Hohenfeldt

[57] ABSTRACT

A conduit clamp assembly having a band and first and second jaws, the jaws connected one to each of the opposite ends of the band and the jaws having interfitting teeth configured to permit insertion of one jaw into the other and to oppose separation of the jaws once engaged. The band includes a beam connected to the interior the band, the beam extending along and spaced from a length of the interior of the band and the beam being movable toward and away from the band and engaging the conduit before the band. An elongated strap is connected at one end to the band and extends from the band. A tab is attached to the strap in an area spaced from the connection of the strap to the band, the tab being connectable to an element so that the clamp is attachable to a conduit with a bushing and the strap is attachable to the element to maintain attachment of the element to the conduit when the element is separated from the bushing.

7 Claims, 1 Drawing Sheet

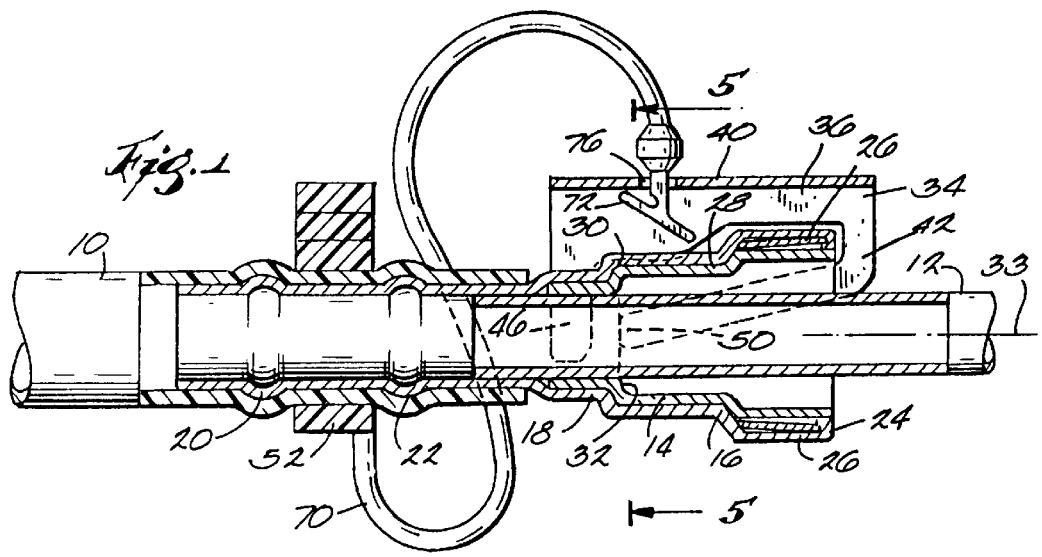

CONDUIT CLAMP AND TETHER

BACKGROUND OF THE INVENTION

This invention relates to clamps for attachment to a conduit or the like and, more particularly, to a clamp which acts as a tether for maintaining connection between an otherwise separable element and a conduit.

Various clamp constructions for attachment to conduits, or similar members have been proposed in the past. Clamps of this type usually include mating jaws connected by a flexible band. The jaws are provided with teeth which are configured to permit the insertion of one jaw into the other and which oppose separation of the jaws once engaged. The band and the jaws are then placed around the conduit with the jaws being inserted one into the other until the clamp firmly grips the conduit.

Generally, such prior clamp constructions have been limited to the range of conduit diameters they can accommodate. That is, the band and jaws are designed such that they will not accommodate and thus cannot be used with a wide range of diameters or thicknesses of conduits.

Furthermore, such prior clamps have been intended solely to clamp onto a particular conduit to secure the conduit and not necessarily to provide a tether for attachment of an element to the conduit.

SUMMARY OF THE INVENTION

It is an object of this invention to provide a conduit clamp which will accommodate a wide range of diameters of conduits.

It is a further object of this invention to provide such a clamp that acts as a tether to permit the clamp to be used as an anchor for maintaining a connection of an element to the conduit.

In general terms, the invention provides a clamp which has first and second mating jaws, the jaws being connected by a flexible band. The band is flexible so that the jaws can be brought into overlapping engagement to surround a conduit. The jaws have interfitting teeth which are configured to permit insertion of one jaw into the other and to oppose separation of the jaws once they are engaged. A flexible beam is connected to the interior of the band between the jaws. The flexible beam is movable relative to the band such that when the band encircles the conduit, the conduit engages the beam and flexes the beam toward the band as the jaws are brought into engagement. A hinge section is provided in the band and is spaced from both of the mating jaws. Preferably, the flexible beam is provided on one part of the band which is between the hinge section and one of the jaws.

The invention also includes, in a preferred embodiment, an elongated strap which is connected at one end to the band and has a tab attached to the strap at a point spaced from the connection of the strap to the band. A hinge section is provided in the area of connection of the tab to the strap. The tab provides a mechanism whereby an element, normally separable from the conduit, can be attached to the strap so that, with the clamp mounted on the conduit, the otherwise separable element is relatively permanently attached to the conduit.

Other features and advantages of the invention will become apparent to those of ordinary skill in the art upon review of the following detailed description, claims, and drawings.

BRIEF DESCRIPTION OF THE DRAWINGS

FIG. 1 is a section view through a quick-disconnect fuel line showing a conduit clamp assembly for securing a connector;

FIG. 2 is a plan view of the clamp assembly;

FIG. 3 is a side view of the conduit clamp attached to a conduit; and

FIG. 4 is a side view of the conduit clamp attached to a conduit of a different diameter than the conduit of FIG. 3.

FIG. 5 is a partial section taken generally along line 5—5 in FIG. 1 and illustrating only the relationship between the connector and its relation to the fuel line fittings.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

The invention will be described in connection with an automobile quick-disconnect fuel line and fuel line connector. However, it should be noted that the invention is useful in a wide variety of other applications with varying types of conduits and separable elements.

Referring to FIG. 1, a type of fuel line joint is illustrated between two fuel line conduits or segments 10 and 12. Segment 12 has its end 14 fitting within the end 16 of segment 10. A metal bushing 18 extends into the interior of segment 10. Bushing 18 includes spaced, raised ribs 20 and 22, the function of which will become apparent as this description proceeds. The outer end 24 of bushing 18 carries a number of spring leafs 26 spaced around the interior of end 24. Only two spring leafs are illustrated in FIG. 1.

A second metal bushing 28 has an end 30 which encircles an end of fuel line segment 12. As shown in FIG. 1, bushing 28 fits within bushing 18 so that fuel line segments 10 and 12 can be connected for fuel flow therebetween. Bushing end 30 is configured to provide a generally radial shoulder 32 which extends around the axis 33 of the fuel line segments 10 and 12. Spring leafs 26 will engage bushing 28 to cooperate in holding bushing 28 within bushing 18.

Continuing to refer to FIG. 1, a separable element or connector 34 bridges the joint formed by the bushings 18 and 28. The connector 34 is a formed, one piece member which is generally U-shaped in cross-section with a pair of spaced sides 36, of which only one side is shown in FIG. 1, connected by a web 40. At one end, the sides 36 each have an arm 42 turned back and extending toward the opposite end of the connector 34. At the opposite end of the connector 34, the sides 36 are provided with a spaced spring clip 46. Clips 46 are formed to fit around a segment of bushing 18 and firmly grip the bushing 18.

After bushing 28 is inserted in bushing 18, the arms 42 of sides 36 extend into the interior of bushing 18 and the ends 50 of the arms 42 engage shoulder 32. Clips 46 are pressed onto the bushing 18 to complete a secure connection of the ends of fuel line segments 10 and 12, the connection which can be quickly disconnected by simply releasing connector 34 and separating the bushings 18 and 28.

One of the problems usually encountered during use of separable elements such as connector 34 is that the connector 34, once removed, can be dropped and lost. This is a particular problem when working under an engine hood, which is generally somewhat cramped and full of various engine attachments. To solve this problem, the clamp assembly illustrated in FIG. 2 has been provided.

Referring to FIG. 2, the tether or clamp assembly 52 includes a clamp 53 having a pair of jaws 54 and 56 connected by a band 58. Jaw 54 includes a tongue 60 spaced from a jaw section 62. Jaw section 62 is provided with a plurality of spaced, angular teeth 64 which face toward the tongue 60. Jaw 56 includes a jaw section 66 which includes a plurality of angular, spaced teeth 67.

The band 58 is generally flexible so that jaw section 66 can be moved toward and between tongue 60 and jaw section 62 to assume the position illustrated in FIGS. 3 and 4. In those positions, the teeth 64 and 67 interfit. Due to their angular configuration, teeth 64 and 67 permit relatively unimpeded movement of jaw section 66 between tongue 60 and jaw section 62 and the interfitting teeth 64 and 67 prevent withdrawal of jaw section 66 from the opening between tongue 60 and jaw section 62 once engaged. This type of interfitting engagement in clamp 53 has been known in the past and is widely used in clamps of various types.

To enhance the flexibility of band 58, a hinge section 68 is provided in an area spaced from both jaws 54 and 56. As is evident in FIG. 2, the hinge section 68 has a reduced cross section as compared to the portions of band 58 adjacent the hinge section 68. Strap 70 is connected to band 58, preferably adjacent hinge section 68. Strap 70 is elongated having a uniform cross-section along its length and extends laterally from band 58 and has a tab 72 attached to its free end. The tab 72 is disposed at an angle to the longitudinal axis 71 of strap 70.

As a result of inherent flexibility in tab 72 and strap 70, tab 72 can be moved relative to the strap 70 to reduce the angle therebetween. To facilitate this relative movement between the tab 72 and the strap 70, a hinge section 74 is provided at the joint between the tab 72 and the end of strap 70. The hinge section 74 has a reduced cross section relative to the portion of strap 70 adjacent the hinge section 74.

Referring back to FIG. 1, connector 34 includes an opening 76. Tab 72 can be inserted into opening 76. Once the tab 72 is inserted and released, the connector 34 remains securely attached to the clamp 53 via strap 70 and tab 72. With this arrangement, when the connector 34 is removed from the bushing 18, the connector 34 remains attached to the fuel line segment 10 via the clamp 53 encircling segment 10 between ribs 20 and 22.

A knot 71 is provided in the strap 70 adjacent the end which carries the tab 72. The knot is generally circular in cross-section and larger in cross-section than strap 70 and opening 76. The knot limits the amount of strap which can go through opening 76. In addition, the knot provides a grip point to assist in pushing the tab and the band into opening 76.

Referring now to FIGS. 3 and 4, the clamp 53 includes a flexible beam 80 which allows the same clamp 53 to accommodate a number of conduit diameters. Structurally, the flexible beam 80 includes an inner end 82 attached to band 58 between hinge section 68 and jaw 56. The beam 80 extends along and is spaced from a length of the interior of the band 58. A flexible membrane 84 extends between the beam 80 and the inner surface of the band 58.

As illustrated in FIG. 3, the clamp 53 is securely mounted on a conduit A of a certain diameter. In this installation, the jaws 54 and 56 are fully engaged and conduit A is clamped between the flexible beam 80 and the section of the band 58 between hinge section 68 and jaw 54. The flexible beam 80 offers some inherent resistance as the clamp 53 encircles conduit A. Membrane 84 also offers resistance to insure a firm grip of the clamp 53 on the fuel line segment 10.

As illustrated in FIG. 4, the clamp 53 is securely mounted on a conduit B which has a larger diameter as compared to conduit A shown in FIG. 3. The jaws 54 and 56 are engaged, although not fully, and conduit B is securely held between the band 58 and the flexible beam 80. In this installation, the flexible beam 80 has been collapsed toward the band 58 to a greater degree than beam 80 of FIG. 3.

The clamp assembly 52 is molded as a one piece plastic member. For example, the plastic can be a nylon 6/6 high impact material.

We claim:

1. In a fuel line connection wherein releasable bushings establish a connection between two fuel line segments and a connector spans the bushings and releasably engages both bushings to establish the connection therebetween, a clamp assembly comprising, in combination, a clamp having a flexible band and first and second jaws, said jaws connected one to each end of said band, said jaws having interfitting teeth configured to permit insertion of one jaw into the other and to oppose separation of said jaws once engaged, an elongated flexible strap connected at one end to said band and extending from said band, a linear tab oriented obliquely relative to said strap and attached to said strap in an area spaced from the connection of said strap to said band for angular movement relative to said strap, and a knot in said strap having a cross-section greater than that of said strap and located in said strap adjacent said tab, said tab being connectable to the connector so that said clamp is attachable to the fuel line and said strap is attachable to the connector to maintain attachment of the connector to the fuel line when the connector is separated from the bushings.

2. The clamp assembly of claim 1 wherein said hinge and said hinge section comprise sections of reduced cross-section as compared to respective portions of said strap and said band.

3. The clamp assembly of claim 1 wherein said band includes a beam connected to the interior of said band extending along and spaced from a length of the interior of said band, said beam being movable toward and away from said band and engaging the fuel line before the band.

4. The clamp assembly of claim 3 including a flexible membrane extending between said band and said beam.

5. A combined clamp and tether assembly comprising:

a pair of opposed arcuate jaws having lower ends joined to each other by means of a hinge and upper ends interengagable with each other to secure the jaws around an elongate structure;

a flexible inner beam extending along a portion of one of the opposed arcuate jaws having a lower end joining the one jaw adjacent the hinge and an upper end coupled to the one jaw through a flexible membrane, the inner beam thereby being spaced from and displaceable toward the one jaw;

an elongate flexible tether having one end joining the opposed arcuate jaws and an opposite end extending away from the opposed arcuate jaws; and a tab at the opposite end of the tether oriented obliquely relative to the tether and angularly displaceable relative to the tether.

6. A combined clamp and tether as defined in claim 5 wherein the combined clamp and tether comprises a single unitary structure.

7. A combined clam and tether as defined in claim 6 wherein the combined clamp and tether is formed of molded plastic.

* * * * *